United States Patent [19]
Kress et al.

[11] 4,162,132
[45] Jul. 24, 1979

[54] IMPLEMENTS

[75] Inventors: Werner Kress, Ulm-Lehr; Johann Katzer, Neu-Ulm; Franz Lopic, Burlafingen; Willi Hepperle, Westerstetten, all of Fed. Rep. of Germany

[73] Assignee: Gardena Kress and Kastner GmbH, Fed. Rep. of Germany

[21] Appl. No.: 789,317

[22] Filed: Apr. 20, 1977

[30] Foreign Application Priority Data

Apr. 22, 1976 [DE] Fed. Rep. of Germany ....... 2617621

[51] Int. Cl.$^2$ .............................................. B25G 3/02
[52] U.S. Cl. .................................................. 403/361
[58] Field of Search ............... 403/361, 362, 359, 321, 403/324, 325, 327, 330, 108

[56] References Cited
U.S. PATENT DOCUMENTS

| | | | |
|---|---|---|---|
| 268,301 | 11/1882 | Smith | 403/334 X |
| 645,977 | 3/1900 | Shields | 403/361 X |
| 1,211,865 | 1/1917 | McIntire | 403/325 X |
| 1,229,843 | 6/1917 | Whitaker | 403/334 X |
| 1,262,482 | 4/1918 | Hales | 403/362 X |
| 1,332,898 | 3/1920 | Hossie et al. | 403/362 X |
| 1,475,257 | 11/1923 | Bottone | 403/321 |
| 2,487,696 | 11/1949 | Coffing | 403/334 X |
| 2,672,924 | 3/1954 | Anthes | 403/325 X |
| 2,682,414 | 6/1954 | Richardson | 403/325 X |
| 2,808,278 | 10/1957 | Snyder | 403/361 X |
| 2,840,382 | 6/1958 | Velepec | 403/334 X |
| 2,974,965 | 3/1961 | Welles | 403/361 X |
| 3,004,362 | 10/1961 | Day | 403/361 X |

*Primary Examiner*—Wayne L. Shedd
*Attorney, Agent, or Firm*—Steele, Gould & Fried

[57] ABSTRACT

A set of garden or household implements comprises various different garden tool and/or household implement heads and at least one handle which can be selectively attached to any of the heads by means of a quick-connect coupling. The coupling comprises a coupling sleeve on the handle and a coupling pin on each head. The pin and the sleeve are so configured that the pin cannot turn or tilt in the sleeve. Abutments on the pin and the sleeve limit the extent to which the pin can be pushed in. Removal of the head from the handle is prevented by a releasable locking member, which is provided on the sleeve and co-operates with the pin. The locking member can comprise a transverse screw or a sneck which engages in a peripheral groove in the pin or a transverse latch which can engage in a transverse bore in the coupling pin.

36 Claims, 8 Drawing Figures

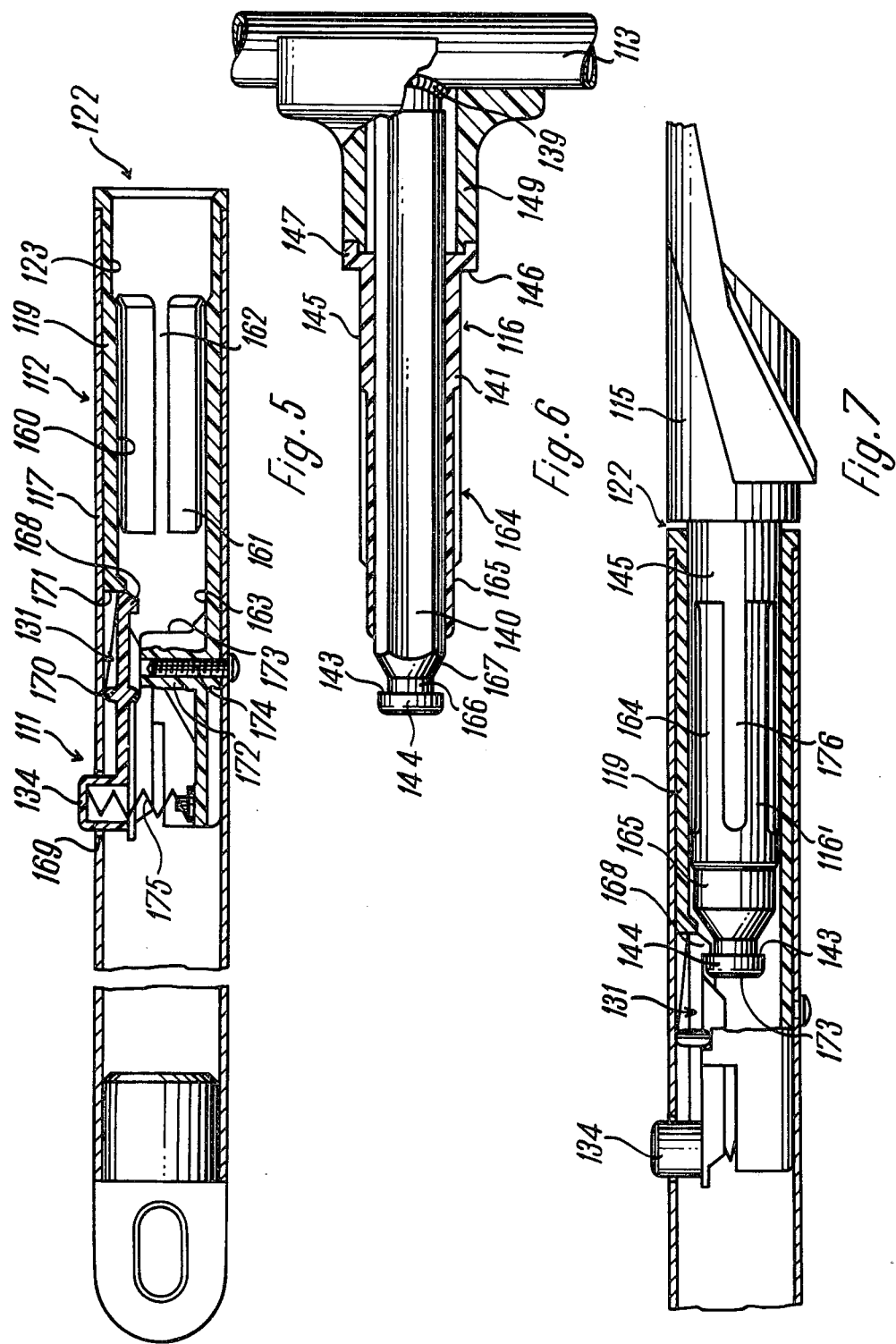

IMPLEMENTS

The invention relates to implements, such as gardening tools and household implements.

Gardening tools which comprise an implement head or actual working tool and a handle generally have the head rigidly mounted on the handle, normally by means of a conical sleeve which is located on the head and into which is fitted one end of the handle. The head is secured to the handle by means of a screw or a nail which passes through a hole in the sleeve. Furthermore, in the case of domestic implements, such as brushes and brooms, it is known to provide the handle with a conical screw-threaded spigot which is screwed into a complementary screw-threaded sleeve on the implement head.

Efficient and time-saving gardening requires a large number of implements, such as hoes, rakes, cultivators, harrows and similar gardening tools. However, the transport and storage of such tools constitutes a problem, particularly in small gardens which do not have special tool-storage space. Therefore, most garden-owners have to manage with a minimum of tools which do not render it possible to cultivate the garden to an optimum extent.

A feature of the invention is to provide a system in which these storage and transport problems do not arise and which also permits the economical use of the best kinds of tools in small gardens.

In accordance with the invention, there is provided a set of various implements which comprises an implement head and a handle, the handle being releasably attached to the implement head by means of a manually operable quick-connect coupling. By this means one implement head can be removed from the handle and quickly replaced by an identical or preferably different implement head forming part of the same set.

Thus, the garden-owner can possess a large number of garden tools which form part of the system and all of which use the same handle. This is based on the assumption that only one person normally works in the garden. However, the system is simplified and rendered less expensive even when the system is provided with several handles, which need not all be of the same length. The particular tool heads required can then be rapidly coupled manually to the handle or handles. The handle (or the few handles) required can then be stored separately from the tool heads and, for example, it can be hung flatly on a wall, while the tool heads can be placed on a shelf or special holder in a space-saving manner. Transport from the place of storage to the place of use is substantially facilitated, since there is no need to transport a large number of tools which are rendered bulky by their individual handles.

The coupling should couple the implement head to the handle so that it is secured preferably against turning, pressure and tension, and the coupling should be, as far as possible, insensitive to dirt.

A preferred embodiment has a quick-connect coupling which comprises a male coupling pin on the implement head and a coupling sleeve, containing the coupling mechanism, on the handle. The coupling mechanism may comprise a clamping screw which acts upon the coupling pin and at the same time the coupling pin, preferably of non-circular cross section is prevented from turning and tilting and is resistant to tension.

A particularly preferred embodiment is one in which the coupling sleeve is constructed such that the coupling pin, when clamped, assumes a somewhat sloping position within the coupling sleeve, so that play-free guidance is provided on the one hand and, on the other hand, the screw-thread for the clamping screw can be of adaquate length despite making the coupling sleeve of relatively small diameter.

Alternatively, however, there is a number of types of self-engaging snap couplings which can be used for the quick-connect coupling in the implement set of the present invention.

The invention is further described, by way of example, with reference to the accompanying drawings in which:

FIG. 1 is a perspective view of a gardening set, constructed in accordance with the invention and comprising a handle and three tool heads, any of which can be coupled to the handle, FIG. 2 is a longitudinal section through a quick-connect coupling by means of which the handle and the gardening tools are connectible to one another, shown during coupling or uncoupling, FIG. 3 is an illustration similar to that shown in FIG. 2, but the handle and a gardening tool head are shown firmly connected to one another by the coupling, and the entire coupling pin of the coupling is made from plastics material, FIG. 4 is a cross section taken on the line IV—IV of FIG. 3.

FIGS. 5 and 6 are fragmentary longitudinal sections through a different embodiment of a quick-connect coupling, showing the coupling sleeve and a coupling pin disassembled.

FIG. 7 is a fragmentary longitudinal section through the coupling similar to that of FIGS. 5 and 6, but shown in the coupled state, and with a coupling pin made from plastics material.

Figure 1:
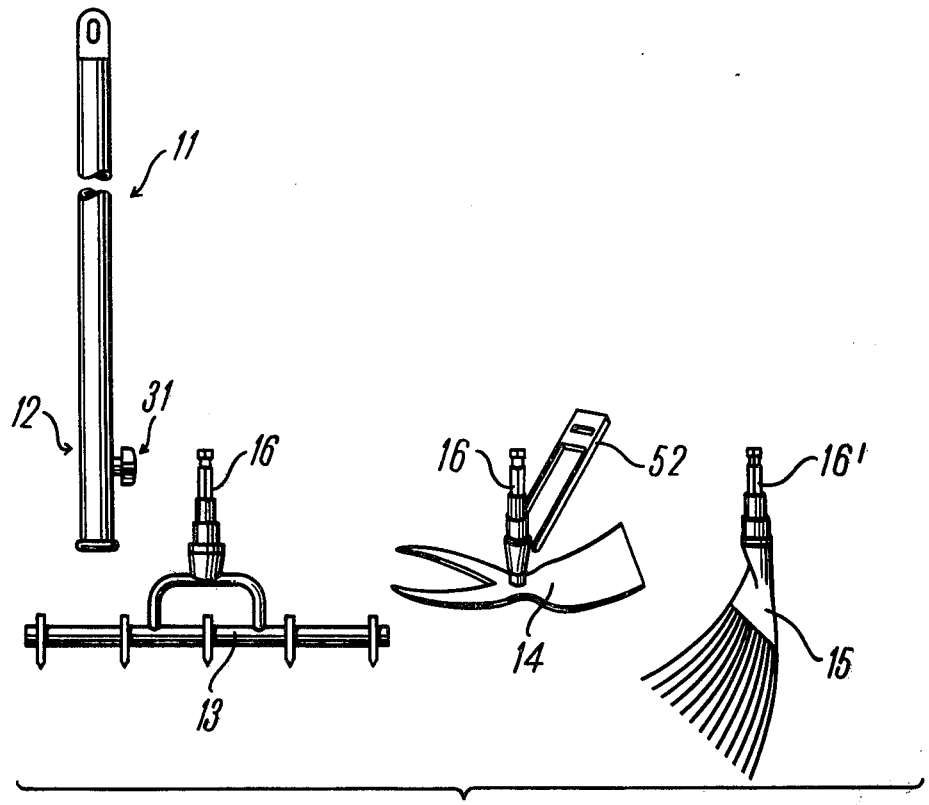

FIG. 1 shows a gardening tool set comprising a handle 11 having a quick-connect coupling 12 at one end, and a plurality of different tool heads 13, 14, 15 each of which has a coupling nipple or pin 16 or 16'. The coupling pins 16 are rigidly and non-releasably attached to the tool heads. The illustrated tool heads comprise a harrow 13, a hoe 14, and a besom 15 which is made entirely from plastics material. All types of gardening tools requiring a handle can be included in the system by providing the tool heads with the corresponding coupling pin. It is also possible to include handles of various constructions and/or various dimensions in a set comprising a large number of gardening tools. Thus, the cost of acquiring, accommodating and transporting the gardening tools can be considerably reduced. Hitherto, each gardening tool had to have an individual handle, thus causing considerable difficulties when storing the tools in a small space. The described gardening tool set renders it possible to use the most suitable working tool at any given time, particularly for small gardens and those not having any special tool-storage space. Nevertheless, the storage space available is adequate, since only one handle is required in order to use the large number of tool heads which can be stored in a simple manner. The essential feature of the quick-connect coupling 12 is that it enables the coupling operation to be carried out rapidly and without difficulty, and it is adequately secure against pressure, tension and turning and is not susceptible to dirt. In particular, the portion of the coupling on the tool head should be of particularly simple construction, since it is manufactured in large numbers and is subjected to soiling to a greater extent than the portion of the quick-connect coupling located on the handle. Thus, it is advantageous for the male coupling element (the coupling pin) to be located on the tool head and for the female element of the coupling, i.e. the element having a movable locking member, to be located on the handle.

Figure 2:
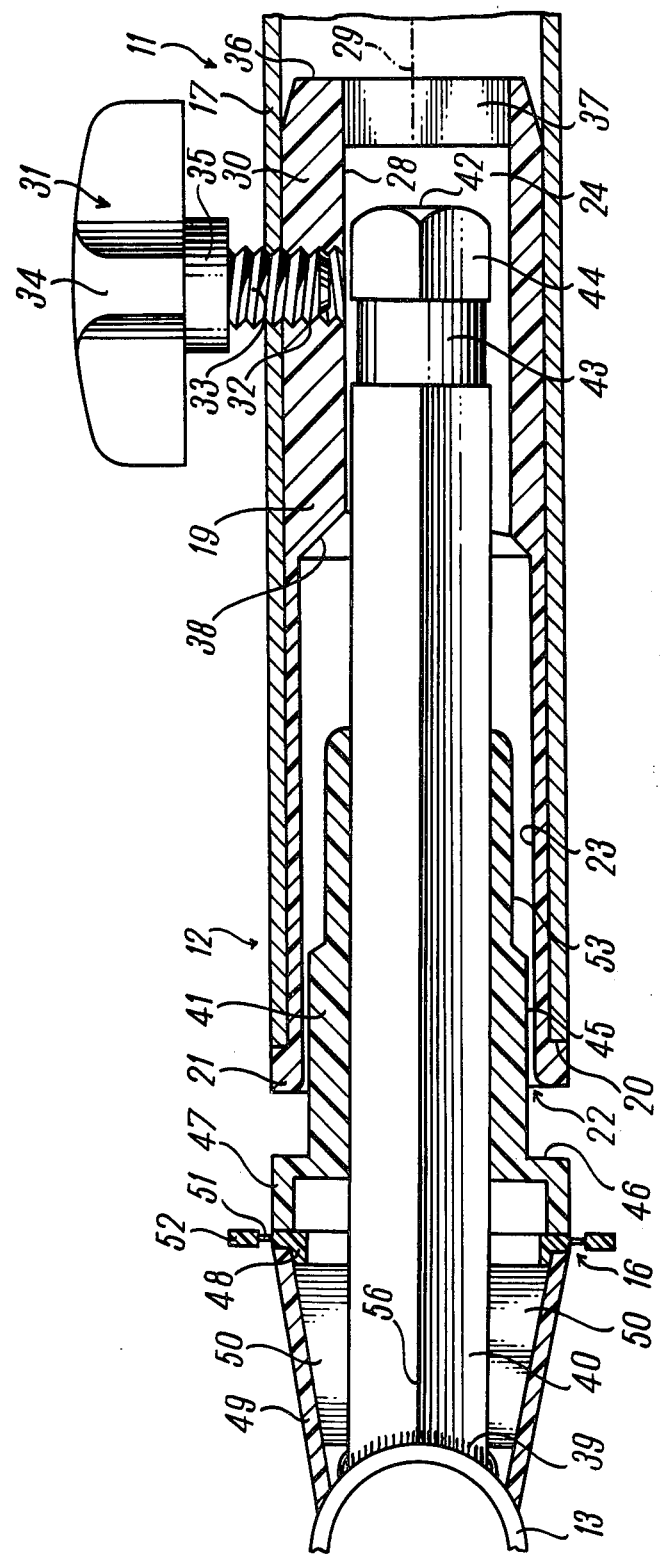
Figure 3:
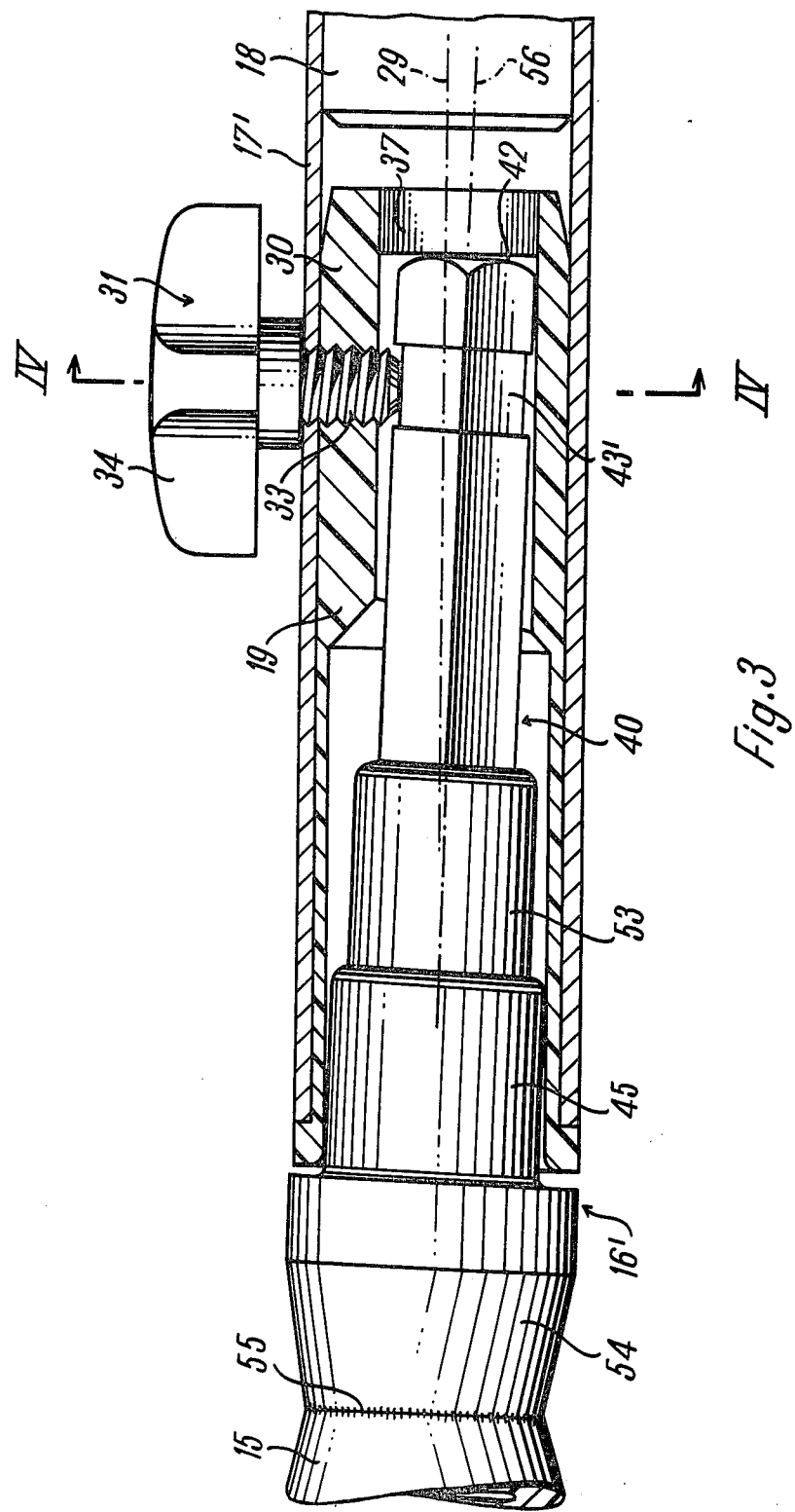

The quick-connect coupling 12 of FIG. 1 is illustrated in FIG. 2. The entire handle 11 can comprise a tube 17, preferably an aluminum tube, as is shown in FIGS. 1 and 2, or, alternatively, as is shown in FIG. 3, it may comprise a wooden handle 11 to which a tubular portion 17' is secured.

An insert 19, made from plastics material, is inserted into the end of the tube 17 facing the tool head and has a flange 21 by which it abuts against the end 20 of the tube. The insert 19 has a large cylindrical central opening 23 which extends from its mouth 22 at the end of the handle into the interior of the handle to an extent equal to approximately twice to three times its diameter. The insert has a locating portion 24 which is contiguous to the insertion portion formed by the opening 23 and, in the illustrated embodiment, is in the form of an opening having an irregular hexagonal cross section.

Figure 4:
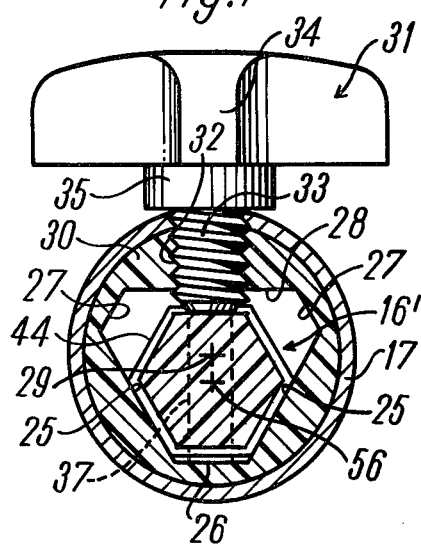

As may be seen particularly in FIG. 4, the surfaces of the locating portion are inclined to one another at 120° although the individual surfaces are of differing size. Two broad surfaces 25 are interconnected by a narrower surface 26. Two even narrower connection surfaces 27 are adjacent to the other sides of the surfaces 25 and are interconnected by means of a surface 28.

The surfaces 25 are at an angle of 60° to one another and act as contact surfaces. The locating portion is arranged eccentrically towards one side of the central longitudinal axis 29 of the insert 19 and of the tube 17, i.e. towards the bottom surface 26 so that a relatively thick-walled portion 30 is formed between the surface 28 and the outer periphery of the insert to receive a screw 33 which forms part of a locking member 31, the screw 33 being screwed into the wall portion 30. The external screw-thread of the screw 33 of the locking member 31 cooperates with an internal screw-thread 32 which is provided in the metal wall of the tube 17 and also in the plastics wall portion 30. The locking member 31 comprises, in addition to the metal screw 33, an actuating handle 34 of plastics material which is injection moulded onto the screw 33. A collar 35 may be provided on the actuating handle 34 to form a limiting stop which, by abutting against the outer surface of the tube 17, prevents the screw 33 from being screwed too far into the tube 17.

The opening forming the locating portion 24 is open towards the inner end 36 of the insert 19, so that any dirt entering the insert can drop therethrough in this direction. In the case of heavy soiling, it is also possible to flush the insert by means of a jet of water. However, a cross member 37 is provided in the region of the inner end 36 and extends transversely across the locating portion 24 (also see the broken lines in FIG. 4) and forms a stop for limiting the extent to which the coupling pin 16 can be pushed in. The transition between the cylindrical central opening 23 and the hexagonal eccentric locating portion 24 is chamfered to form a guide 38.

In the illustrated embodiment, the coupling pin 16 comprises an hexagonal bar 40 which is connected to the gardening tool head 13 by means of a weld 39 and which has a regular hexagonal cross section, and a plastics sheath 41 which is slipped onto the hexagonal bar with a press fit and which forms a radial guide portion.

The hexagonal bar 40 has, at a relatively short distance from its free end 42, a continuous annular recess which forms an engagement surface 43 for the locking member 31. The depth to which the engagement surface 43 is cut is at least sufficient to form a continuous cylindrical surface. The engagement surface 43 defines a hexagonal head 44 at the free end 42 of the coupling pin, the front end of the head 44 being slightly chamfered.

The portion of the plastics sheath 41 extending into the opening 23 is widened in two stages, thus facilitating insertion of the coupling pin into the opening 23. Its largest step forms a radial guide surface 45 which cooperates with the wall of the opening 23. An outwardly directed radial shoulder 46 and an annular portion 47 of the plastics sheath 41 are contiguous to the radial guide surface 45 received in the mouth 22. A conical transition piece 49 is contiguous to the annular portion 47 but a plastics ring 48 is interposed therebetween. The transition piece 49 is guided on the hexagonal bar 40 by means of internal ribs 50 and is contiguous to a portion of the gardening tool head, so that, inter alia, the welded seam 39 is overlapped and the hexagonal bar 40 is fully covered in this rear region.

The plastics ring 48 forms part of a hanger and is connected to a suspension portion 52 (shown in FIG. 1) by way of two bridge portions 51 of greatly reduced cross section. This hanger can readily be made injection moulding from plastics material, since the suspension portion 52 can be injection-moulded in the same plane as the plastics ring 48. The thin bridge portions 51 permit rotation of the suspension portion through 90°, so that the tool head can be suspended thereby. If this suspension portion should be troublesome during the subsequent use, it can readily be removed by pulling it away from the ring 48 tear the bridge portions 51. However, the suspension portion 52 is very advantageous for display and sales purposes, since it can carry a label and a price tag.

The embodiment of FIG. 3 differs from the embodiment of FIG. 2 in that the entire coupling pin 16' is made from plastics material. However, its design is identical to that described with reference to FIG. 1, with the sole exception that the engagement surface 43 does not comprise a cylindrical groove produced by a turning operation as in the metal embodiment, but comprises a slightly countersunk depression 43' of the same hexagonal configuration as the rest of the front portion of the coupling pin. To avoid local mass concentrations of plastics material, the cylindrical steps 53, 45, integrally formed with the hexagonal front portion of the coupling pin, and the contiguous transition portion 54, may be of hollow construction. The transition portion 54 replaces the annular portion 47, the plastics ring 48 and the transition piece 49 of FIG. 2. The coupling pin 16' made from plastics material is intended particularly for tool heads which are made from plastics material and which are not subjected to excessive stress and, preferably, may be connected to the gardening tool head 15 by means of an annular friction weld 55.

FIG. 2 shows the coupling pin 16 during insertion into the coupling sleeve comprising the tube 17 and the insert 19. It will be seen that insertion can be effected substantially coaxially, i.e. the central longitudinal axis 29 of the handle substantially coincides with the central longitudinal axis 56 of the coupling pin. The coupling pin can be inserted in a very simple manner, since alignment is effected in stages. Thus, for example, the diameter of the head 44 is substantially smaller than that of the opening 23. The head 44 strikes against the insertion chamfer 38 substantially at the same time as the smaller step 53 enters the region of the mouth 22. This results in axial pre-alignment. The locating portion 24 is dimensioned such that the hexagonal portion of the coupling portion still has a relatively large amount of play therein in the direction of rotation, although the coupling nipple can be pre-aligned with respect to its rotary position. Thus, the head 44 still has a considerable amount of play in the locating portion 24, and a certain amount of accurately predetermined play also still exists between the wall of the opening 23 and the radial guide surface 45 of the plastics sleeve 41 which thereupon enters the opening 23.

When, as is shown in FIGS. 3 and 4, the retaining member 31 is actuated by screwing in the screw 33 by turning the actuating handle 34, the screw 33 presses against the engagement surface 43 and presses two of the hexagonal surfaces of the coupling pin against the contact surfaces 25. The coupling pin is thus finally secured against turning and is also forcibly secured in the direction of pull by the tightening of the screw 33 in the annular groove 43 while it is secured in the pushing direction by abutment of the end face 42 of the coupling pin against the cross member 37.

The coupling pin is thereby slightly tilted within the insert, i.e. its central axis 56 is at a small angle of, for example, 1.5° to the central longitudinal axis 29 of the handle. As is shown in FIG. 3, the radial guide surface 45 thus assumes a sloping position in the opening 23, such that the play previously existing between the radial guide surface and the opening is eliminated and substantially play-free guidance now exists. As may be seen, the play depends upon the axial length of the radial guide surface and the angle of tilt. Furthermore, the eccentricity of the locating portion 24 has the advantage that, by virtue of the thick wall portion 30 thus produced, the screw-thread in the plastics material can be longer, so that the screw can also withstand high stresses and frequent unscrewing and tightening. The hexagonal construction of the engagement surface 43' ensures that the screw makes surface contact in the somewhat less robust plastics pin 16'. In the illustrated embodiment, the locking member 31 at the same time fulfils a further function, namely that of holding the insert 19 in the tube 17 or 17'. It is to be noted that the coupling pin 16, 16' is secured by frictional force, although the coupling pin is positively prevented from slipping out by the somewhat countersunk engagement surface 43 when the locking member 31 is not fully tightened. It is advantageous to the function that the stop in the pushing direction, as well as the interior radial guide surface and the engagement surface 43 for the locking member are located in the region of the free end of the coupling pin, since the retaining member is scarcely stressed by bending forces acting upon the coupling, since the lever arm is very large between the radial guide surface 45 located in the region of the mouth 22 and the radial guide surfaces in the region of the head 44.

By virtue of the features of the invention, it is possible to accommodate a very robust coupling in a tube having a diameter corresponding to the normal handle diameter of approximately 23 to 25 mm. By way of example, the diameter of the opening 23 can be approximately 19 mm. Play-free guidance is ensured despite the fact that the diameter of the portion 45 is approximately 1 mm smaller. The solid hexagonal bar can have dimensions of 12 mm between the faces located opposite to one another (width across flats), and the length of the portion 45 is approximately 18 mm when the length of a coupling pin to be inserted is approximately 80 mm. The surfaces 25 are subjected to the wedge action of the surfaces of the hexagonal bar so long as the bottom surface 26 of the locating portion 24 is not engaged. This can lead to additional wedging of the insert 19 in the tube 17, and may be desirable. However, by appropriate dimensioning of the surfaces 25 and 26 it is alternatively possible to provide for the head 44 to press directly against the bottom surface 26.

FIG. 5 shows a handle 111 and another embodiment of quick-connect coupling 112 forming part of a gardening tool set, while FIG. 6 shows an associated coupling pin 116 which is mounted on a tool head 113 which is of the same type as the tool head 13 of FIG. 1 (i.e. a harrow) and only a small part of which is illustrated.

The quick-connect coupling illustrated in FIG. 5 has a plastics insert 119 which is inserted into the tube 117 forming the handle and which has a cylindrical coaxial opening 123 in the region of its mouth. A guide portion 160 is contiguous to the opening 123 and has inwardly projecting ribs 161 which start from the same diameter as the opening 123 and between which are formed longitudinally extending grooves 162. A cylindrical opening 163 is again formed contiguously to this relatively long guide portion.

The elongate couplong pin 116 of FIG. 6 is of corresponding construction. It has a step 145 of larger diameter which forms the radial guide surface near to the mouth, a guide portion 164 serving to prevent turning of the tool head relative to the handle, and an inner cylindrical radial guide portion 165 again contiguous to the guide portion 164. The diameter of the cylindrical surface of the guide portion 164 is equal to that of the radial guide portion 165, i.e. the smaller diameter, while the six projecting ribs have, in conformity with the grooves 162, external dimensions equal to the diameter of the radial guide portion 145. The described portions 145, 164, 165 are formed on an elongate sheath 141 which is made from plastics material and which is slipped onto a hexagonal metal bar 140 which is connected to a metal part of the tool head by means of a weld 139. This weld is covered by a transition and spacer piece 149 which is connected to a flanged portion 147 of the plastics sheath 141. A radial shoulder 146 is provided between the radial guide portion 145 and the flange 147 and fills in the gap in the region of the mouth 122 of the insert 119.

The free end of the coupling pin 116 has a fairly short cylindrical head which has a somewhat smaller diameter than the dimension across the flats of the hexagonal bar and which has a planar end face and an engagement surface 143 in the form of a radial shoulder facing the tool head. The engagement surface 143 is defined by one face of a plunge-cut annular groove 166 whose other face 167 is conically chamfered.

FIG. 5 shows the retaining member 131 of the quick-connect coupling 112. This retaining member is a self-engaging snap coupling. The retaining member comprises a double-arm lever which is made from plastics material and which has at one end a sneck 168 provided with front chamfer and a substantially radial retaining surface. An actuating member 134 in the form of a pushbutton is formed at the other end of the double-arm lever and extends outwardly through an opening 169 in the tube 117. The double-arm lever forming the retaining member is provided on each side with a laterally projecting bead 170 which forms a knife-edge bearing for the lever on a correspondingly constructed portion of the insert 119. Axial fixing in the direction of pull is effected by virtue of the fact that the retaining member 131 abuts in the region of its sneck 168 against a radial surface 171 of the insert 119. A projection 172 extending into the opening 163 forms an abutment surface 173 for the head 144 of the coupling pin and recieves a screw 174 which secures the insert 119 to the tube 117. A compression spring 175 urges the actuating knot 134 outwardly and thus urges the retaining member 131 into its engaged position. The retaining member is only inserted into the insert and its bead is held by the tube 117. FIG. 7 shows the snap coupling of the type illustrated in FIGS. 5 and 6 in its engaged state. The handle, that is the female coupling member 112, is identical to that described with reference to FIG. 5 (and is provided with the same reference numerals), while the function and the basic shape of the coupling pin 116' is also identical to that shown in FIG. 6, but it is made entirely from plastics material and is injection-moulded directly onto the tool head 115 (only partially illustrated). Here also, the individual parts are provided with the same reference numerals as in FIG. 6.

It will be seen that, here also, the coupling pin 116 can be readily guided into the handle by virtue of the fact that the two parts are of multi-step construction. As in the embodiment described previously, the head 144 has a substantially smaller diameter than the mouth 122, so that the long coupling pin, which is more than four times as long as its largest diameter, readily slides into the insert. Shortly before the end of this movement, it strikes against the sneck 168 and, as a result of the lead chamfer, pivots the retaining member 131 in an anti-clockwise direction. Just before the head 144 of the coupling pin strikes against the abutment surface 173 at the absolute end of its movement, the sneck 168 engages behind the radial engagement surface 143 under the action of the spring 175 and fixes the coupling pin in the direction of pull. The tensile force is then transmitted to the insert 119 by the shortest path, in that the front end face of the sneck 168 abuts against the radial surface 171. Thus, the mounting of the retaining member 131 is not subjected to any axial force. Here also, the distance between the bridge-like abutment surface 173 and the engagement surface 143 is relatively small, so that differences in length cannot be detrimental. Prevention of turning is established by the ribs 176 in cooperation with the grooves 172, and the two portions 145, 165 ensure satisfactory radial guidance owing to the relatively large axial distance therebetween.

The quick-connect coupling of FIGS. 5 to 7 has the advantage that it permits one-hand operation, i.e. it only has to be pushed together during the coupling operation and automatically engages. The actuating knot 134 is pressed only during the uncoupling operation in order to release the sneck 168 from the head 144. The coupling pin can then be withdrawn from the coupling sleeve.

Figure 8:
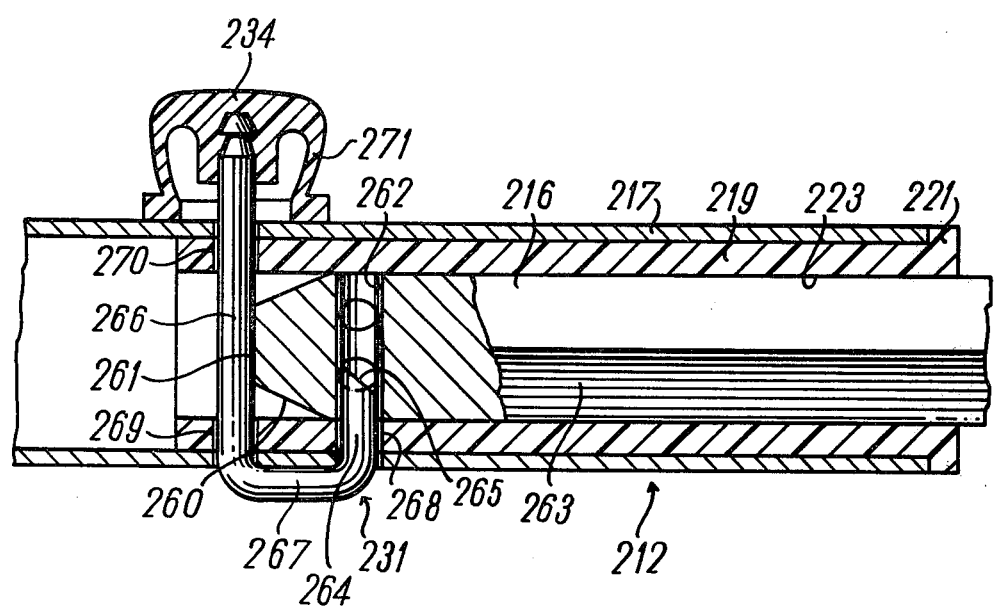
FIG. 8 is a fragmentary longitudinal section through a further embodiment of quick-connect coupling.

A further embodiment of quick-connect couplings is illustrated in FIG. 8. An insert 219 in the form of a plastics sleeve is provided in the tube 217 forming part of the handle and has a flange 221 which abuts against the end of the tube. The insert 219 has an opening 223 having a regular hexagonal cross section whose dimensions are adapted to the coupling pin 216 which is in the form of a hexagonal bar.

The coupling pin 216 is welded to a tool head (not illustrated). The free end of the coupling pin is provided with a conical chamfer 260 which terminates at a planar end face 261. Shortly before the commencement of the chamfer 260, the coupling pin is provided with three transverse bores 262 which intersect one another, the axes of which bores are at 120° relative to one another. Each transverse bore opens into the centre of one of the surfaces 263 of the hexagonal bar forming the coupling pin 216.

The quick-connect coupling 212 of FIG. 8 is also a self-engaging snap coupling. Its retaining member 231 is displaceable transversely of the insertion direction and, in the present embodiment, is in the form of substantially J-shaped member which is bent from a round steel bar and whose shorter limb 264 forms a latch portion which has a lead chamfer 265 and which is intended and dimensioned to extend into a bore 262. The bent 267 of the J-shaped member is contiguous to the limb 264 and forms a connection portion. The other longer limb 266 is contiguous to the connection portion and extends transversely through the insert 219 and the handle. The shorter limb 264 and the longer limb 266 extend through bores 268, 269 at one side of the handle, which bores extend through the tube 217 and also through the insert 219. Thus, the connection portion 267 is located outside the handle. The longer limb 266 also extends through a bore 270 at the opposite side. The free end of the longer limb is of barb-like configuration in cross section. An actuating knob made from resilient plastics material or rubber is slipped onto the barb-like end of the longer limb and its resilient skirt 271 abuts against the exterior of the handle and pulls the retaining member 231 to the position, illustrated in FIG. 8, in which the U-shaped bend 267 abuts essentially against the side of the handle remote from the actuating knob 234, and the latch portion 264 is located in the bore 262. This construction of the actuating knob at the same time results in a satisfactory seal against the intrusion of dirt. However, it is also possible to provide a spring which assists or replaces the resilient skirt 271.

The coupling operation is effected simply by inserting the coupling pin. Th hexagonal construction provides security against turning, and the elongate construction of the coupling pin ensures adaquate radial guidance and security against tilting.

The chamfer 260 cooperates with lead chamfer 265 of the retaining member and urges the latter downwardly (as viewed in FIG. 8) against the force of the resilient skirt 271 until the latch portion 264 can engage into one of the bores 262.

This coupling is of particularly simple construction. Alternatively, the engagement surfaces for the coupling, formed by the transverse bores 262, may be in the form of a continuous groove, thus preventing the coupling pin from being weakened to too great an extent at the point of engagement the abutment in the direction of pushing is formed by the limb 266 which at the same time fixes the insert 219 in an axial direction relative to the tube 217.

By virtue of the arrangement of the elongate pin on the tool head, the pin can also be used as a temporary handle. Advantageously, in order to further increase the versatility, it is also possible to provide several types of handles, such as a long handle for normal work and a short handle which makes the same tool head suitable for a special purpose, such as making a small rake suitable for use as a cemetery rake. Other implements, such as brooms, snow-shovels, and the like, can be incorporated the set in additon to gardening tools.

We claim:

1. In combination with a set of implements comprising at least one handle and a plurality of implement heads, a quick-connect coupling system comprising:

first and second interengageable parts, each of said implement heads having said first coupling part thereon and said handle having said second coupling part thereon, whereby each implement head can be selectively attached to said handle;

one of said coupling parts comprising a female coupling sleeve having an open mouth and being provided with a moveable locking member thereon and the other of said coupling parts comprising a male coupling pin having a fixed locking surface thereon with which said locking member can cooperate to lock said coupling parts together, said coupling pin and said coupling sleeve having mutually abutting surfaces which are so shaped and adapted to one another that said mutually abutting surfaces prevent said pin from turning relative to said sleeve and include axial abutment faces effective in an insertion direction; and, means providing tilt-free guidance of said pin in said sleeve, said guide means including guide portions which are located in a region near the mouth of said coupling sleeve and which have radial clearance for facilitating insertion of said coupling pin and axial lengths such that a space is formed between said pin and said sleeve, said coupling pin being tilted into a non-coaxial position within said coupling sleeve when engaged by said locking member, a portion of said pin occupying a portion of said space and said clearance being largely eliminated.

2. A set of implements according to claim 1, in which said second coupling part on said handle is the coupling sleeve and said first coupling part on each of said implement heads is said coupling pin, which is directly attached to each of the implement heads.

3. A set of implements according to claim 2, in which said second coupling part includes a metal tube piece and said coupling sleeve is in the form of an insert which is made from plastics material and which is inserted in said metal tube piece.

4. A set of implements according to claim 3, in which said locking member comprises a substantially radially arranged clamping screw and in which a screw-thread for the clamping screw is provided both in said metal tube and in said sleeve inserted therein.

5. A set of implements according to claim 4, in which said clamping screw fixes said inserted sleeve in said metal tube.

6. A set of implements according to claim 4, in which the clamping screw has a collar which abuts against the outer surface of the metal tube.

7. A set of implements according to claim 1, in which said radial guide portions comprise at least two pairs of surfaces separated by at a large axial distance.

8. A set of implements according to claim 1, in which said locking member comprises a substantially radially arranged clamping screw received in said coupling sleeve.

9. A set of implements according to claim 1, in which the portions of the coupling pin and the coupling sleeve which co-operates to prevent turning have a configuration to initially provide substantial play, and serve to pre-align said coupling pin relative to said coupling sleeve during insertion.

10. A set of implements according to claim 1, in which said locking member is adapted to frictionally engage said coupling pin to secure said coupling pin in said coupling sleeve against pull.

11. A set of implements according to claim 10, in which said locking surface for said locking member is countersunk in said coupling pin so as to provide a positive connection as a security against unintentional release of said retaining member.

12. A set of implements according to claim 1, in which the guide portions include cylindrical guide portions located in the region near the mouth of said coupling sleeve.

13. A set of implements according to claim 8, in which said coupling sleeve has an end recess which receives said free end portion of said coupling pin and which is radially offset from the central longitudinal axis of said sleeve and in which a screw-thread for the clamping screw is provided in that wall of the sleeve which is remote from the radial offset.

14. A set of implements according to claim 1, in which said quick-connect coupling is a snap coupling said locking member engages under spring force.

15. A set of implements according to claim 14, in which at least one of the locking member and the coupling part engaged thereby has a sloping surface which renders possible automatic snapping-in when assembling the coupling.

16. A set of implements according to claim 14, in which said locking member comprises a two-armed lever which is pivoted in the sleeve, said locking surface on the coupling pin being substantially radial, one end of said lever co-operating with said locking surface and an opposite end of said lever having therein a push-button for releasing the coupling.

17. A set of implements according to claim 1, in which said coupling pin is hexagonal in cross section.

18. A set of implements according to claim 1, in which at least some of said implement heads comprise gardening tool heads.

19. A set of implements according to claim 1, in which at least some of said implement heads comprise domestic implement heads.

20. An implement head for attachment to a handle having a female coupling sleeve with an open mouth and provided with a moveable locking member, the implement head having a male coupling part adapted to mate with a coupling sleeve of the handle to form a coupling part adapted to mate with a coupling sleeve of the handle to form a coupling by which said implement head is attached to said handle, said male coupling part comprising:

an elongate coupling pin having a free end and a diameter which decreases step-wise towards the free end, facilitating insertion of said pin and providing a free space between said free end and said sleeve, said pin including peripheral polygonal guide portions, at least in a region adjacent to the free end, to prevent the implement head from turning relative to the handle and peripheral cylindrical guide portions disposed near the mouth of sleeve which cooperate with the pin when the pin is inserted therein;

means defining an abutment effective in the direction of insertion; and, a locking surface near the free end which can be engaged by said moveable locking member on the handle, the cylindrical guide portions interfitting with said free space when said coupling is engaged by said locking member, whereby said free end is pressed against said sleeve, occupying a portion of said space, and said pin is tilted within said sleeve.

21. An implement head according to claim 20, in which said coupling pin is rigidly and non-releasably connected to said implement head.

22. An implement head according to claim 20, in which said coupling pin has a peripheral groove, said locking surface being defined in said groove.

23. An implement head according to claim 20, in which said means defining said abutment effective in the direction of insertion comprises a free end surface on said coupling pin.

24. An implement head according to claim 20, in which said coupling pin consists entirely of plastics material.

25. An implement head according to claim 20, in which said coupling pin comprises a metal part and a plastics sheath which is arranged thereon and which has at least one cylindrical guide portion thereon.

26. An implement head according to claim 25, in which said sheath is pressed onto the metal part of said pin.

27. An implement head according to claim 25, in which said metal part of said pin consists of a polygonal section bar.

28. An implement head according to claim 25, in which said sheath has a flange disposed outside the mouth of a coupling sleeve on the handle, when the handle is fitted to the implement head.

29. An implement head according to claim 28, which further comprises a plastics shield which covers a region of the metal part of the coupling located between the flange and the implement head.

30. An implement head according to claim 20, in which said peripheral portions of the coupling pin which prevent the coupling pin from turning comprise outwardly projecting longitudinal ribs.

31. An implement head according to claim 20, in which said polygonal guide portions of the coupling pin which prevent the coupling pin from turning, are disposed between the cylindrical guide portions and the free end of the pin.

32. An implement head according to claim 20, in which a head of relatively small diameter is defined at the free end of said coupling pin and has a shoulder directed away from the free end to define said locking surface.

33. An implement head according to claim 20, in which said coupling pin has at its free end a head having a polygonal cross-section, which simultaneously defines said peripheral portions for preventing turning of the head and serves as a radial guide surface.

34. An implement head according to claim 20, in which said polygonal portion has a regular hexagonal cross-section, at least in the region adjacent the free end.

35. An implement head according to claim 20, wherein the diameter of at least a section of the cylindrical guide portion of the pin is approximately one millimeter (1 mm.) smaller than the corresponding diameter of the coupling sleeve.

36. An implement head according to claim 20, wherein the cylindrical guide portion of the coupling pin is a plastic member.

* * * * *